United States Patent [19]
Toko

[11] Patent Number: 5,946,069
[45] Date of Patent: Aug. 31, 1999

[54] LIQUID CRYSTAL DISPLAY DEVICE AND FABRICATION METHOD THEREOF

[75] Inventor: Yasuo Toko, Machida, Japan

[73] Assignee: Stanley Electric Co., Ltd., Tokyo, Japan

[21] Appl. No.: 09/054,594

[22] Filed: Apr. 3, 1998

[30] Foreign Application Priority Data

May 22, 1997 [JP] Japan .................................. 9-132660

[51] Int. Cl.⁶ .............................................. G02F 1/1339
[52] U.S. Cl. .............................................. 349/155
[58] Field of Search .................................. 349/155

[56] References Cited

U.S. PATENT DOCUMENTS 5,328,728  7/1994  Swirbel et al. ........................ 349/155

Primary Examiner—William L. Sikes
Assistant Examiner—James Dudek
Attorney, Agent, or Firm—Frishauf, Holtz, Goodman, Langer & Chick, P.C.

[57] ABSTRACT

A method of fabricating a liquid crystal display device with high quality of display comprises the steps of: preparing a pair of substrates, at least one of which has an electrode surface and a surface of a level lower than or a surface having a higher surface energy than the electrode surface exposed on a surface of the one substrate; distributing liquid and spacers on a surface of the one substrate; and applying an external force on the surface of the one substrate to move the liquid and spacers.

19 Claims, 6 Drawing Sheets

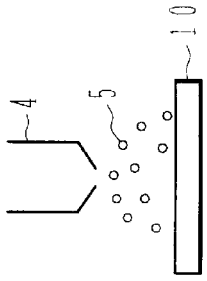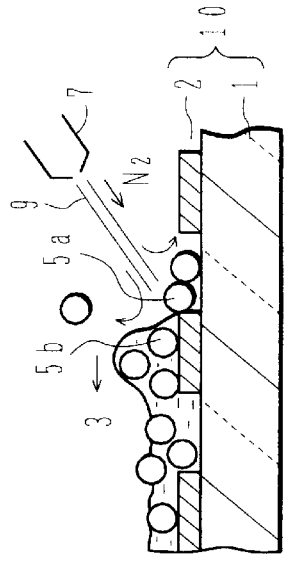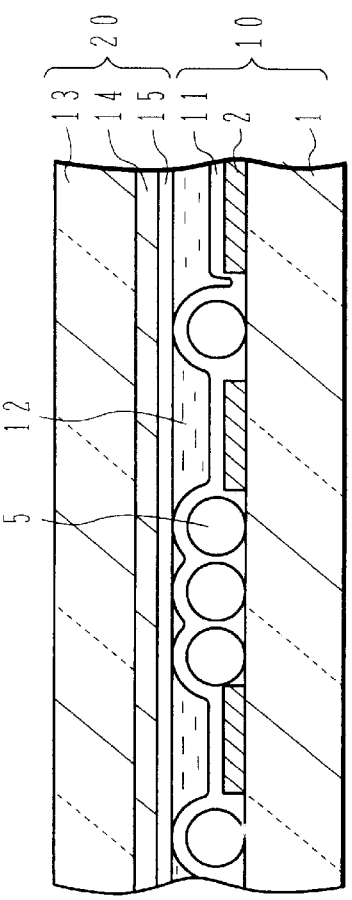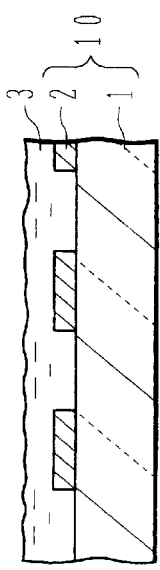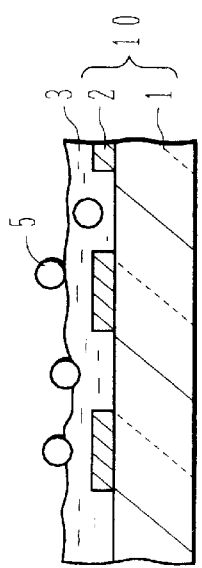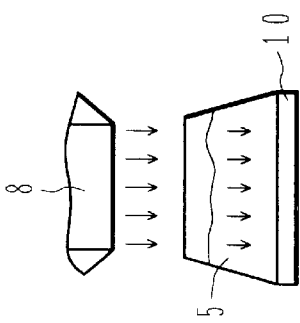

GAS BLOW →

LIQUID CRYSTAL DISPLAY DEVICE AND FABRICATION METHOD THEREOF

This application is based on a Japanese patent application No. 9-132660 filed on May 22, 1997, the entire contents of which are incorporated herein by reference.

BACKGROUND OF THE INVENTION

1. Field of the Invention

The present invention relates to a liquid crystal display device and a fabrication method thereof, and more particularly to a liquid crystal display device with high quality of display and to a fabrication method thereof.

2. Description of the Related Art

Liquid crystal display device makes a desired display by controlling the orientation of liquid crystal molecules by an electric field. In order to generate the electric field, the liquid crystal display device usually has opposed or facing electrodes on a pair of parallel substrates.

In order to keep the distance between the opposed electrodes constant, spacers are disposed between the pair of the opposed substrates. Transparent true spheres or other members are used as spacers. For example, uniform cell gap can be realized by dispersing the spacers over the surface of one of the substrates as random as possible and another substrate is disposed thereon. In this case, the spacers are distributed also over the electrode in a display region.

The spacer shows no or little change in the optical properties upon application of an electric field. If the spacers are located on an electrode in the display region, the liquid crystal material cannot enter into the volume occupied by the spacers, resulting in formation of regions not responding to an electric field. The display region is desired to make a display of high contrast in response to on/off of an electric field. However, existence of the region not responding to an electric field results in lowering of the contrast.

The spacer forms an interface of liquid crystal regions within a liquid crystal layer. Liquid crystal molecules within a liquid crystal layer and those on a liquid crystal interface have different orientation characteristics. If the spacers are located within a liquid crystal layer which is required to form the interface only on the substrate surface, orientation of the liquid crystal molecules is disturbed, resulting in a lowering of the display quality.

SUMMARY OF THE INVENTION

An object of the present invention is to provide a liquid crystal display device or a fabrication method thereof capable of preventing lowering the display quality due to existence of spacers.

Another object of the present invention is to provide a liquid crystal display device and a fabrication method thereof capable of distributing spacers only in regions except the display region by simple processes.

According to one aspect of the present invention, there is provided a method of fabricating a liquid crystal display device comprising the steps of: (a) preparing a pair of substrates, at least one of the substrate having an electrode surface and a surface of a level lower than or a surface having a higher surface energy than the electrode surface which are exposed on a surface of the one substrate; (b) distributing liquid and spacers on the surface of the one substrate; and (c) moving the liquid and the spacers by applying an external force on the surface of the one substrate.

According to another aspect of the present invention, there is provided a liquid crystal display device comprising: (a) a pair of substrates disposed to face each other, at least one of the substrates having whereon an electrode surface and a surface of a level lower than or a surface having a higher surface energy than the electrode surface on a surface of the one substrate; (b) spacers distributed selectively on the surface lower than the electrode surface or the surface having a higher surface energy; and (c) liquid crystal filling a space between the pair of the substrates.

On a surface of at least one of the substrates, a step is formed by an electrode or surfaces of different surface energy are formed and then spacers are distributed only in the region of a lower level or a higher surface energy using the step and/or a difference of surface energy due to different materials. Thus, the spacers can be dispersed only in the region except the display region.

In this way, the spacers can be disposed selectively in a region outside the display region. Hence, it is possible to prevent the lowering of the display quality by the existence of the spacers.

It is not necessary to add a new photolithography process for the selective disposition of the spacers.

BRIEF DESCRIPTION OF THE DRAWINGS

FIGS. 1A to 1F are schematic cross sectional, side and perspective views for illustrating processes of fabricating a liquid crystal display device according to an embodiment of the present invention.

DESCRIPTION OF THE PREFERRED EMBODIMENTS

Figure 2A:
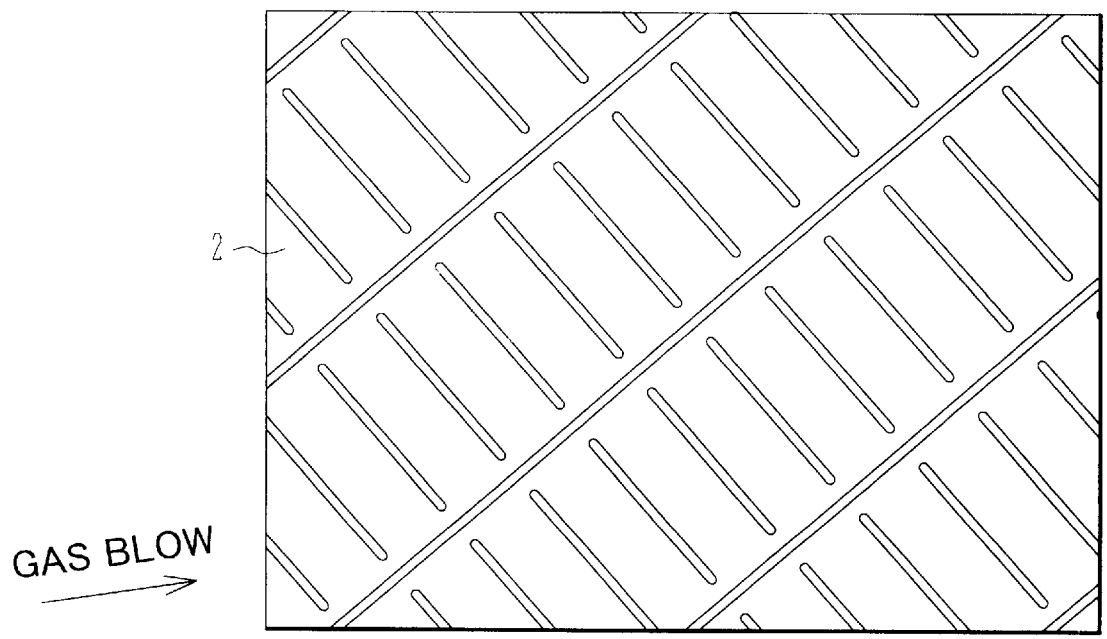
FIGS. 2A and 2B are sketches of microscopic photographs showing a result of an experiment performed according to the embodiment.

An embodiment of the present invention will now be described with reference to the drawings.

FIGS. 1A to 1F illustrate a method of fabricating a liquid crystal display device according to an embodiment of the present invention.

As shown in FIG. 1A, electrodes 2 made of indium-tin-oxide(ITO) are formed on a surface of a transparent glass substrate 1. Though the figure shows the case of a simple matrix structure, similar structure can also be used in the case of an active matrix or metal-insulator-metal(MIM) elements. The electrodes 2 are formed not over all of the surface of the transparent glass substrate 1, and form electrode-less regions on the glass substrate 1. The electrodes 2 are, for example, 200 nm in thickness and form a step of 200 nm in height with respect to the electrode-less region. Glass has a surface different in surface condition from that of the ITO, i.e. the surface of glass has a high surface energy and is well wettable with (does not repel) pyrolidon (NMP) which will be described later, while the surface of ITO has a low surface energy and repels NMP easily.

On the surface of the substrate 10 thus formed, a liquid layer 3 is formed. For example, pyrolidon (NMP) is coated on the surface of the substrate 10 by spin coating for 30 seconds at a rotation speed of 2000 rpm. Thickness of the electrode 2 is not limited to 200 nm. For example, electrodes of 20 nm~300 nm in thickness are usually used.

As shown in FIG. 1B, spacers 5 are sprayed by a dry-type spray 4 over the substrate 10 on which the liquid layer 3 is formed. The spacers are, for example, true spheres of 5 $\mu$m in diameter.

FIG. 1C schematically shows distribution of the spacers 5 over the surface of the substrate 10. For simplification, the figure is shown with varied magnification. The diameter of the spacers is usually 1 $\mu$m~10 $\mu$m, markedly larger than the thickness of the electrode 2. Thus, a liquid-like layer wherein the spacers 5 are mixed in the liquid 3 is formed on the surface of the substrate 10.

As shown in FIG. 1D, a gas jet 9 is blown out of a nozzle 7 onto the surface of the substrate 10 at a definite angle. For example, nitrogen gas jet 9 is blown in a direction at an angle of 30° with respect to the surface of the substrate 10. Nitrogen gas pressure in the nozzle 7 is set, for example, at 5 kgf/cm$^2$. The liquid 3 and the spacers 5 are moved to the downstream by the external force from the nitrogen gas jet 9.

However, the spacers 5a in the electrode-less region are dammed up by the step of the electrode 2 or are left behind by the difference of easiness of displacement (the easiness of being blown off) due to the difference of the surface condition between the electrode and the electrode-less region. The spacers 5b are moved to the downstream together with the liquid 3 by the force from the nitrogen gas jet 9. From a viewpoint of surface energy, it can be said that NMP (and spacers) on ITO are easily blown off, while NMP on the glass surface outside the ITO are hard to be blown off.

The above-mentioned conditions can be changed variously. For example, the gas jet can be blown at an angle between 5° and 85° with respect to the substrate surface. The distance between the nozzle 7 and the substrate is, for example, 30 cm, but can be set at an arbitrary value. The nozzle 7 is only required to blow nitrogen gas jet with a certain width. For a substrate of large area, an air-nife 8 with a wide gas blow nozzle as shown in FIG. 1E can be used.

By scanning the nozzle 7 in one dimentional direction or two dimentional directions, the force from the gas blow can be applied to the entire surface of the substrate 10. Any means other than gas blow can be used, provided that it can apply a force to the liquid 3 and spacers 5. This process is necessary to be done before the liquid evaporates, because the spacers are moved together with the liquid by this process.

By the gas blow, the liquid evaporates while moving in a fixed direction. The spacers are moved together with the liquid, in a state floating slightly on the liquid. Some of the spacers are blown off into the air by stream. The spacers stopped by the step of the electrode or by another cause will remain on the substrate against the external force.

FIG. 2A shows a sketch of a microscopic photograph of a substrate surface on which electrodes are formed. The narrow stripe regions are the electrode-less regions. The liquid layer is formed on the substrate, the spacers are dispersed thereon, and then a gas stream is blown from the direction of the arrow.

Figure 2B:
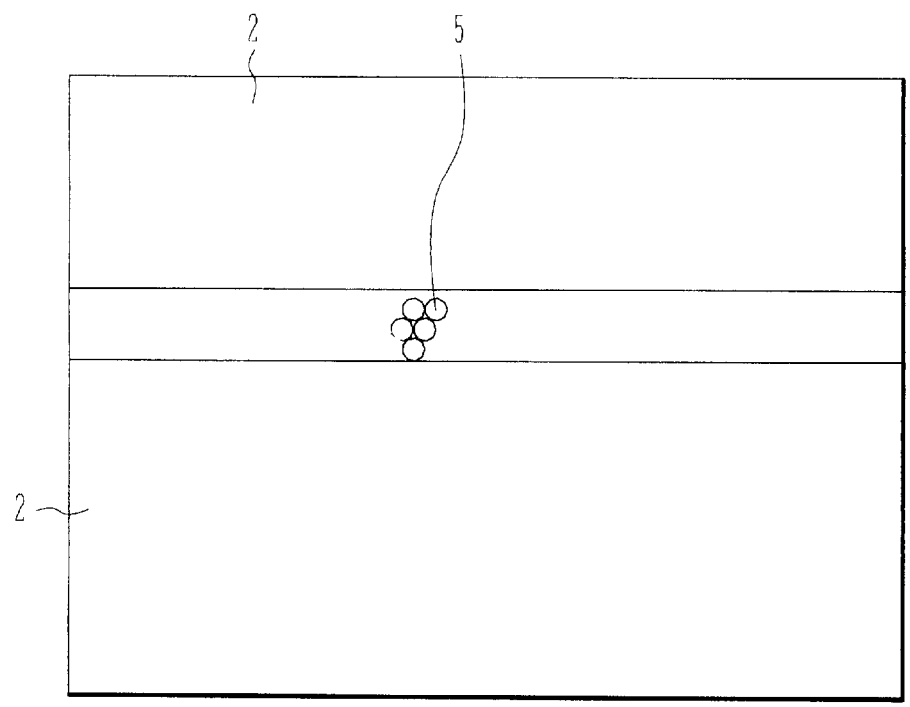

FIG. 2B is a magnified view of a part of the substrate shown in FIG. 2A after blowing the gas jet. The figure shows the electrode regions 2 above and below an electrode-less region extending in the horizontal direction with a width of about 15 $\mu$m. The thickness of the electrode is 200 nm. Five spacers 5 of 5 $\mu$m in diameters remain in the electrode-less region. As a result of an experiment, it was found that a plurality of the spacers cohere and remain in most cases, though sometimes a single spacer remains.

If the spacers are simply sprayed on a glass substrate on which ITO electrodes are formed, most of the spacers remain alone on the surface randomly. As a result of the experiment, the spacers are not only disposed selectively on desired regions on the surface, but also have a tendency that a plurality of spacers cohere together. The cohesion of the spacers is considered to be due to attractive force acting between the spacers.

The density of the spacers 5 remaining on the electrode-less region can be adjusted by the density of sprayed spacers in the step of spraying spacers shown in FIG. 1B.

The spacers having once remained in the step region are considered to be adsorbed on the substrate surface by van der Waals force or another force, and show a property that they are hard to be moved by an external force to some extent in the later steps.

As shown in FIG. 1F, an orientation or alignment film 11 such as polyimide is formed on the substrate surface covering the spacers 5 remaining between the adjacent electrodes 2. An ITO electrode or electrodes 14 are formed on a surface of another transparent glass substrate 13 and an orientation film 15 such as polyimide is formed thereon to form an opposing substrate 20. An orientation treatment by rubbing, light irradiation or another technique is given to the orientation films 11 and 15.

A liquid crystal cell is formed by assembling the pair of substrates 10 and 20 formed as above-mentioned. A liquid crystal 12 is injected into a gap in the liquid crystal cell by vacuum sucking, surface tension or another means. In FIG. 1F, the spacers are illustrated at a scale more faithful to the real one.

The spacers 5 are excluded from the surface of the electrode 2 and selectively dispersed in the electrode-less regions. Thus, it becomes possible to prevent the lowering of the display characteristics of the liquid crystal display device by the spacers 5. The spacers 5 do not exist in the opposed electrode regions which constitute display regions, so that disturbance of the orientation of liquid crystal molecules is decreased to improve the display quality.

FIGS. 3A to 3E schematically show a method of fabricating a liquid crystal display device according to another embodiment of the present invention.

Figure 3A:
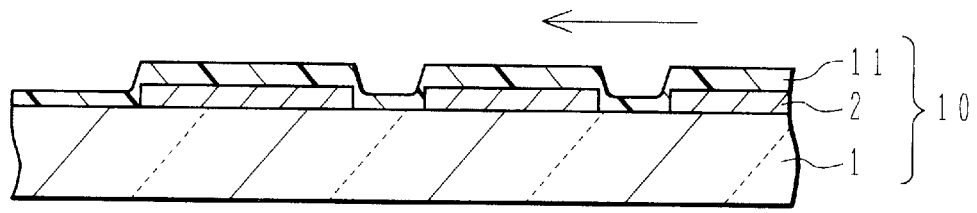
FIGS. 3A to 3E are schematic cross sectional and side views for illustrating processes of fabricating a liquid crystal display device according to another embodiment of the present invention.

As shown in FIG. 3A, ITO electrodes 2 are formed on the surface of a transparent glass substrate 1 and an orientation film 11 is formed thereon. The electrodes 2 are, for example, 200 nm in thickness and the orientation film 11 is, for example, 50 nm in thickness. The orientation film 11 forms a step following the pattern on the underlying electrodes 2. Formation of the step by the pattern of the electrodes is similar to the embodiment shown in FIGS. 1A to 1F. Summarizing these, it can be considered that the surface of the electrode forms a step. The surface state of the orientation film is influenced by the underlying layer (bare glass, ITO or another substance). Hence, the surface energy above the electrode is different from that above the outside of the electrode. After formation of the orientation film 11, an orientation treatment such as rubbing is given, for example, in the direction of the arrow. Thus, a substrate 10 having steps is formed.

Figure 3B:
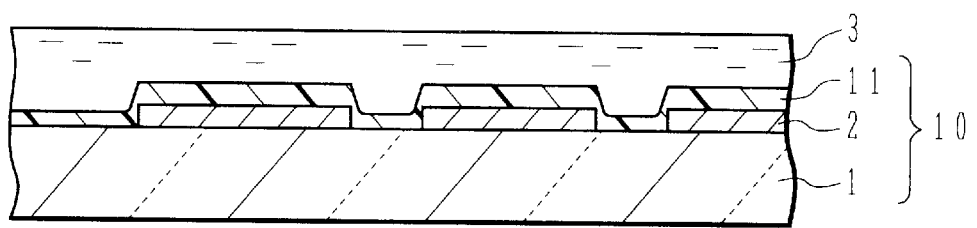

As shown in FIG. 3B, a liquid layer 3 such as NMP is coated on the surface of substrate 10. Coating of the liquid layer 3 can be performed by a similar step as in the embodiment shown in FIGS. 1A to 1F.

Figure 3C:
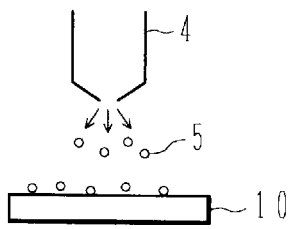
Figure 3D:
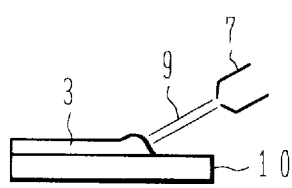

As shown in FIG. 3C, spacers 5 are sprayed by a dry-type method on the surface of the substrate 10. As shown in FIG. 3D, a gas jet 9 is blown from a nozzle 7 and thereby the liquid layer 3 and the spacers 5 on the surface of the substrate 10 are moved in a fixed direction.

The steps shown in FIGS. 3C and 3D are substantially similar to the steps shown in FIGS. 1C and 1D. Difference lies only in the point that the step is formed by the orientation film 11 instead of the electrode 2. The spacers left at the step region are left remaining on the substrate after removing the liquid 3.

Figure 3E:
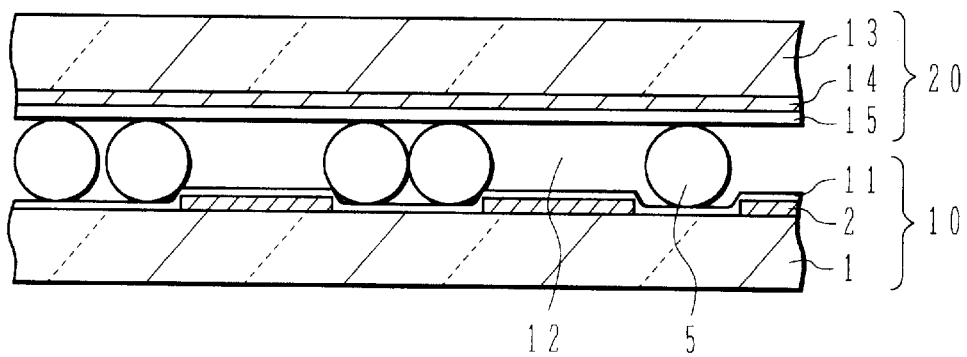

As shown in FIG. 3E, another substrate 20 prepared by forming ITO electrodes 14 and an orientation film 15 on a transparent glass substrate 13 is disposed face to face on the substrate 10 to form a liquid crystal cell. Difference from the case of FIG. 1F lies in the point that the spacers 5 are disposed between the orientation film 11 on the substrate 10 and the orientation film 15 on the substrate 20. Thereafter, liquid crystal material 12 is injected into the gap similarly to the embodiment shown in FIGS. 1A to 1F. In this way, a liquid crystal display device is fabricated.

In the embodiments shown in FIGS. 1A to 1F and FIGS. 3A to 3E, the electrodes 2 have stripe shape and the spacers remain in the electrode-less regions between the pair of adjacent stripe electrodes. It is possible to limit more selectively the regions where the spacers are left. In the embodiments described above, a spacer basically contacts at two points, one on the substrate surface and another on the edge of the electrode surface. If the spacer contacts the surface of the electrode at two points, the force of fixing the spacer may be strengthened. The experimental result shown in FIGS. 2A and 2B may be interpreted to show that the spacers have a tendency to be attached more stably as the number of contact points is increased. In order to let the spacer contact the edge of the electrode surface at two points, the plan shape of the electrode may be arranged to have bending portions.

Figure 4A:
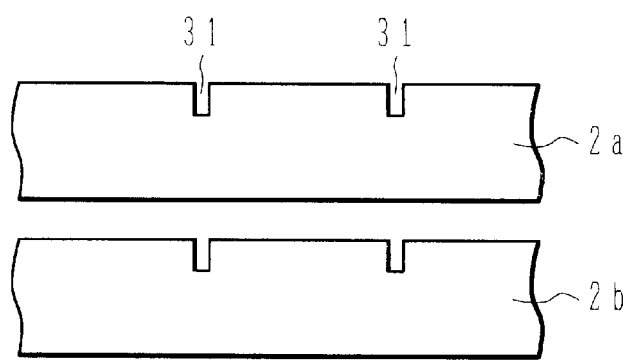
FIGS. 4A to 4D are schematic plan views for illustrating further embodiments of the present invention.

FIGS. 4A to 4D show structures of striped electrodes having rectangular concave or cut-away portions. Referring to FIG. 4A, electrodes 2a and 2b are basically parallel striped electrodes. Each of the electrodes 2a and 2B has concave portions 31 on the upper side. The electrodes 2a and 2b are, for example, 185 μm in width and are disposed at 200 μm pitch with a gap of 15 μm.

On the upper sides of the electrodes 2a and 2b, rectangular concave portions 31 of, for example, 10μm in width and 15 μm in depth are formed. The width of 10 μm is a width in which two spacer materials can be aligned in the transverse direction when the spacers of, for example, 5 μm in diameter are used. Similarly, the depth of 15 μm is a depth capable of aligning three spacers. In this way, the concave region is desired to have an area capable of accomodating several spacers.

Figure 4B:
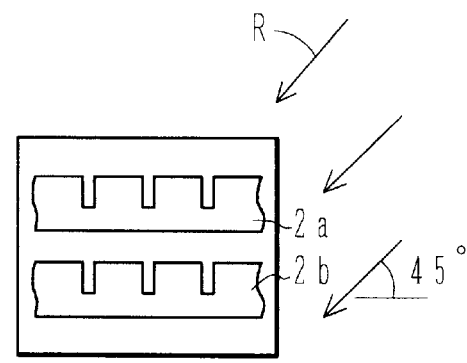

FIG. 4B schematically shows direction of blowing a gas jet to the electrodes with concave portions provided as described above. For example, a gas jet is blown from a direction R at an angle of 45° with the longitudinal direction of the striped electrodes 2a and 2b into the inside of the concave portions as shown in the figure. The direction of blowing the gas jet toward the substrate surface (polar angle direction) is preferably chosen in a range from 5° to 85° as described above.

Figure 4C:
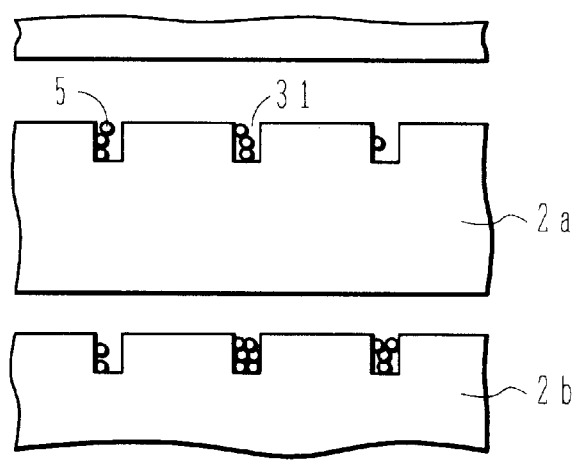

FIG. 4C shows an example of the distribution of the spacers remaining in the concave portions after dispersing the spacers and blowing the gas jet. The concave portions 31 each have an area capable of accomodating several spacers so that the spacers 5 are selectively left in the concave portions 31. No spacers exist on the electrodes 2a and 2b.

Figure 4D:
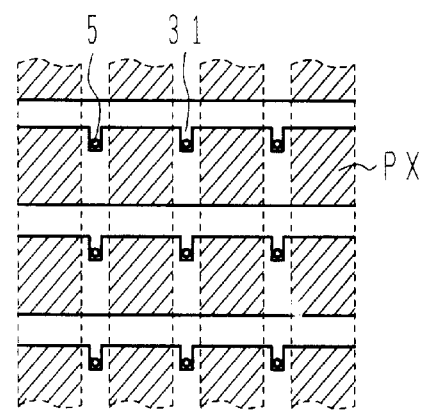

FIG. 4D schematically shows superposed state of the other substrate. Broken lines show the disposition of the parallel striped electrodes on the other substrate. Hatched regions PX constitute display regions of pixels. The concave portions 31 are disposed in the regions where no electrode exists on the other substrate. Hence, there is no spacer in the display regions formed by the opposed electrodes.

In the embodiment shown in FIGS. 4A to 4D description has been made on the case, where the concave portions capable of accomodating several spacers are formed in the electrodes. It is also possible to selectively leave spacers by another shape of the electrode.

Figure 5A:
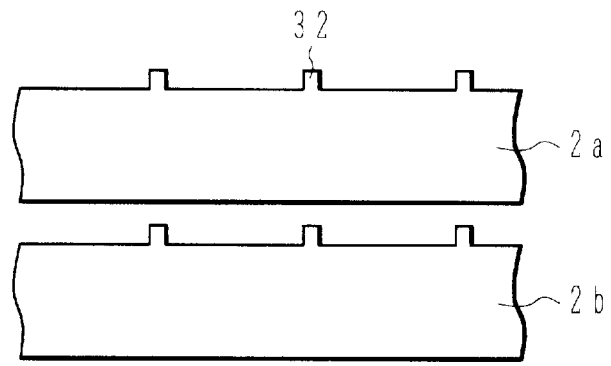
FIGS. 5A to 5C are schematic plan views for illustrating another embodiment of the present invention.
Figure 5B:
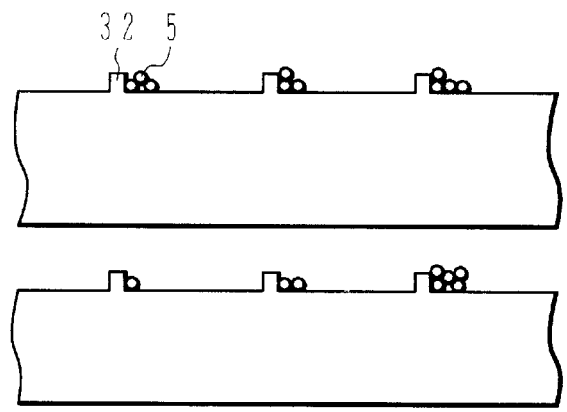
Figure 5C:
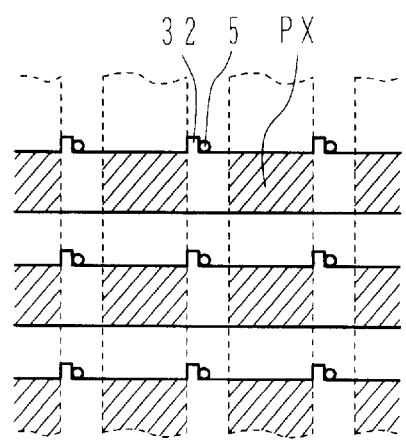

FIGS. 5A to 5C show structures in which convex portions are provided instead of concave portions. A kink is formed by a convex portion.

As shown in FIG. 5A, rectangular convex regions 32 are formed in electrodes 2a and 2b. The convex regions 32 are, for example, 5 μm in width and 5 μm in length. The distance between the pair of adjacent convex regions 32 is long. There exists no force for selectively restricting spacers in the transverse direction of the figure in this intermediate region. However, it is possible to leave the spacers only at the kink on one side of the convex region 32 by selecting the direction of gas blow.

For example, after spraying the spacers, nitrogen gas is blown in a direction from upper right to lower left of the figure to move the spacers in the same direction. The spacers are left on the right hand side kink of each convex region 32.

FIG. 5B schematically shows distribution of thus remaining spacers. In the right side region to each convex region 32, one to several spacers 5 are left.

FIG. 5C schematically shows a superposed state of the other substrate having striped parallel electrodes. The broken lines show the striped electrodes on the other substrate. Hatched regions PX constitute display regions.

The convex portions 32 and the spacers remaining on the right side thereof are disposed in the regions where no striped electrode exists on the other substrate. Hence, the quality of the display region is not influenced by the spacers, similar to the embodiment shown in FIGS. 4A to 4D.

Figure 6A:
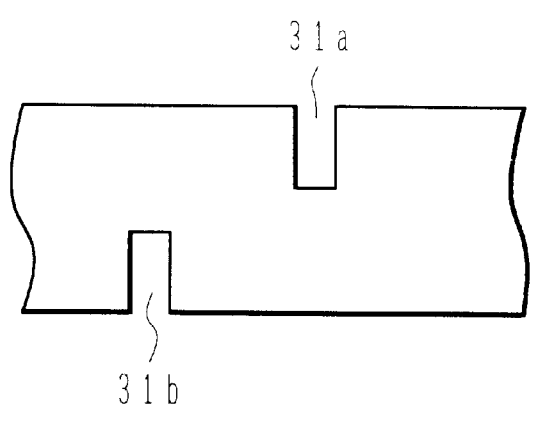
FIGS. 6A to 6D are schematic plan views showing other examples of the configuration of an electrode.
Figure 6B:
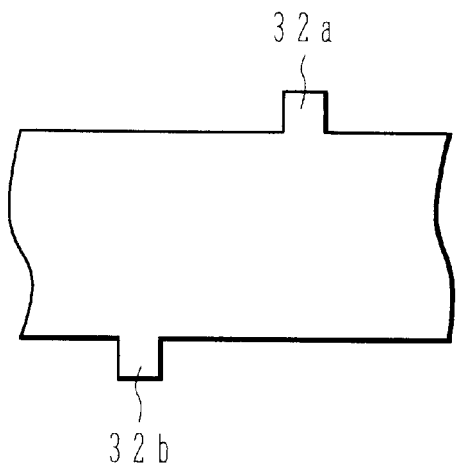

Although concave or convex portions are disposed on one side of each electrode in the cases of FIGS. 4A to 4D and FIGS. 5A to 5C, they can also be disposed on both sides of each electrode as shown in FIGS. 6A and 6B. In this case, distribution of spacers is preferably performed twice varying the direction of the gas blow. The convex or concave portions on both sides of the electrode 2 are preferably allocated at different positions in the longitudinal direction of the electrode.

Although the case of simple matrix device has been described, the invention can also be applied to MIM and thin film transistor(TFT) liquid crystal display devices. In the case of an MIM liquid crystal display device, striped electrodes exist on the opposing substrate so that the above-mentioned arrangement of spacers can be made by using the electrodes on the opposing substrate.

Figure 6C:
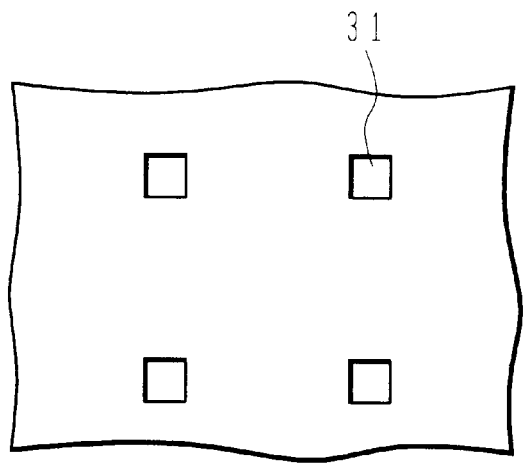
Figure 6D:
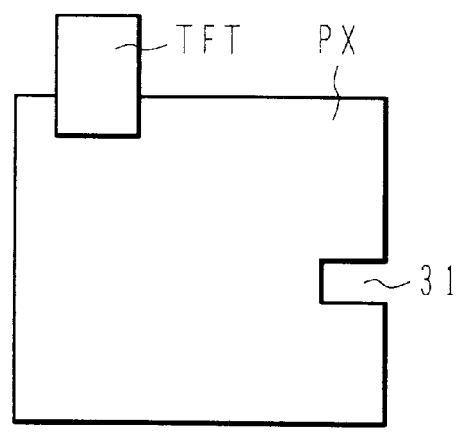

In the case of TFT liquid crystal display device, window patterns 31 for accomodating spacers may be formed in a common electrode as shown in FIG. 6C. As shown in FIG. 6D, a concave region 31 can be formed on a pixel electrode PX on the TFT substrate and spacers can be accomodated therein.

Although NMP has been described as a liquid for moving the spacers on a substrate, butylcellosolve, γ-butylolactone, dietylen-glycohol-methyl-ethylether, glycohol or other substances can be used in place of NMP.

Spin coating has been described as a method of forming a liquid layer. Besides this, printing method, dip method, spray method, a method of simply dropping the liquid on the substrate or other methods can be used. In order to control the number of spacers distributed thereafter, thickness of the liquid layer is preferably as uniform as possible.

Although dry-type spray method has been described as a method of spraying spacers, wet-type spray method or a method of spraying on the substrate a mixture of the spacer materials with liquid solvent can be used. Although spacers of 5 μm in diameter have been described, the spacers of the order of 1 μm to 10 μm in diameter can be used. Spacers of more than 10 μm in diameter can also be used. In this case, however, it is preferable to use an electrode layer of a larger thickness for forming the step.

The direction of gas blowing is not restricted to one direction. In addition, the method of applying an external force to the liquid and spacers is not restricted to gas blow.

NMP used in the embodiments is a liquid with strong polarity. The vaporizing temperature (boiling point) of NMP is about 200° C. When isopropylalcohol (IPA) was used as the liquid, such phenomena that most of the spacers have been lost by the nitrogen blow or that the spacers could not be distributed at desired locations occurred. The vaporizing temperature of IPA is about 82° C. From this fact, it is considered that the vaporizing temperature of the liquid used is preferably higher than 85° C., and more preferably higher than 100° C.

The present invention has been described along the preferred embodiments. The invention is not limited only to the above embodiments. It will be apparent to those skilled in the art that various modifications, improvements, combinations and the like can be made.

What are claimed are:

1. A method of fabricating a liquid crystal display device comprising the steps of:
    (a) preparing a pair of substrates, at least one of said substrates having a substrate surface a portion of which carries an electrode surface and a portion of which does not carry an electrode surface and is an exposed surface; and wherein said exposed surface is lower than the electrode surface;
    (b) distributing liquid and spacers on the surface of said one substrate; and
    (c) applying an external force on the surface of said one substrate to move said liquid and spacers off of the electrode surface and onto the exposed surface so that the spacers are removed from the electrode surface and at least partially remain on the exposed surface.

2. A method according to claim 1, wherein said external force is generated by gas blow.

3. A method according to claim 2, wherein said gas blow is along one direction.

4. A method according to claim 1, wherein said liquid has a vaporizing temperature of 85° C. or above.

5. A method according to claim 1, wherein the step of distributing said liquid and spacers comprises spin coating.

6. A method according to claim 1, wherein the step of distributing liquid and spacers comprises dry-type spraying.

7. A method according to claim 1, wherein the step of spraying liquid and spacers comprises mixing spacers with a liquid and spin-coating the liquid.

8. A liquid crystal display device which is fabricated in accordance with the method of claim 1, said display device comprising:
    (a) a pair of substrates disposed to face each other, at least one of said substrates having a surface portion which carries an electrode surface and a surface portion which does not carry an electrode surface, said surface portion without electrode surface being of a level lower than or having a higher surface energy than the electrode surface;
    (b) spacers selectively distributed on the surface of level lower than said electrode or the surface having a higher surface energy than said electrode surface and not on the electrode surface; and
    (c) liquid crystal material filling a space between said pair of substrates.

9. A liquid crystal display device according to claim 8, wherein said electrode surface has convex or concave edges in directions along the surface of said substrate.

10. A liquid crystal display device according to claim 9, wherein said spacers are selectively distributed along the convex or concave regions or along the regions with a higher surface energy.

11. A liquid crystal display device according to claim 8, wherein said electrode surface is a surface of an electrode formed of ITO.

12. A liquid crystal display device according to claim 8, wherein said electrode surface is a surface of an orientation film formed on an electrode.

13. A method according to claim 1, wherein said liquid has polarity.

14. A method according to claim 1, wherein said liquid is pyrolidon.

15. A method of fabricating a liquid crystal display device comprising the steps of:
    (a) preparing a pair of substrates, at least one of said substrates having an electrode surface and a surface lower than the electrode surface exposed on a surface of said one substrate;
    (b) distributing liquid and spacers on the surface of said one substrate; and
    (c) applying an external force on the surface of said one substrate to move said liquid and spacers; and
    wherein said liquid has polarity.

16. A method according to claim 15, wherein said liquid is pyrolidon.

17. A method of fabricating a liquid crystal display device comprising the steps of:
    (a) preparing a pair of substrates, at least one of said substrates having a surface having surface portions with high surface energies and surface portions with low surface energies, exposed on a surface of said one substrate;
    (b) distributing liquid and spacers on the surface of said one substrate; and
    (c) applying an external force on the surface of said one substrate to move said liquid and spacers off of the surface portions with low surface energy and onto the surface portions with high surface energy so that the spacers are removed from the surface portions of low surface energy but at least partially remain on the surface portions of high surface energy.

18. A liquid crystal display device comprising:
    (a) a pair of substrates disposed to face each other, at least one of said substrates having an electrode surface and a surface of a level lower than or a surface having a higher surface energy than the electrode surface;

(b) spacers selectively distributed on the surface of level lower than said electrode surface or the surface having a higher surface energy than said electrode surface; and (c) liquid crystal material filling a space between said pair of substrates; and wherein said electrode surface has convex or concave edges in directions along the surface of said substrate.

19. A liquid crystal display device according to claim 9, wherein said spacers are selectively distributed along the convex or concave regions or along the regions with a higher surface energy.

* * * * *